United States Patent
Warga

[11] Patent Number: 5,141,379
[45] Date of Patent: Aug. 25, 1992

[54] CONTINUOUS FURNACE FOR THE HEAT-TREATMENT OF WORKPIECES

[75] Inventor: Dieter Warga, Ostfildern, Fed. Rep. of Germany

[73] Assignee: Mahler Dienstleistungs-HmbH Loten - Harten - Anlagenbau, Fed. Rep. of Germany

[21] Appl. No.: 671,438

[22] Filed: Mar. 19, 1991

[30] Foreign Application Priority Data

Mar. 21, 1990 [DE] Fed. Rep. of Germany ....... 4008979

[51] Int. Cl.$^5$ ............................................. B65G 17/08
[52] U.S. Cl. .................................. 414/157; 414/196; 414/211; 198/853
[58] Field of Search ............... 414/147, 150, 157, 172, 414/196, 209, 210, 211; 198/851, 853, 780, 952

[56] References Cited

U.S. PATENT DOCUMENTS

| | | | |
|---|---|---|---|
| 2,681,728 | 6/1954 | Boron | 198/851 |
| 2,986,387 | 5/1961 | Illing | 198/851 X |
| 3,450,260 | 6/1969 | Matthews et al. | 198/851 X |
| 4,709,807 | 12/1987 | Poerink | 198/851 X |
| 4,911,681 | 3/1990 | Funkhouser | 198/851 X |
| 4,971,191 | 11/1990 | Lapeyre | 198/853 |

FOREIGN PATENT DOCUMENTS

| | | |
|---|---|---|
| 1020358 | 7/1955 | Fed. Rep. of Germany . |
| 2854585 | 12/1978 | Fed. Rep. of Germany . |
| 0053912 | 3/1989 | Japan ................................. 198/851 |

OTHER PUBLICATIONS

Ceramic Furnace Belt Inc.; The missing link in continuous high temperature sintering; published Nov. 1989.

Primary Examiner—Frank E. Werner
Assistant Examiner—James Eller
Attorney, Agent, or Firm—Harness, Dickey & Pierce

[57] ABSTRACT

A continuous furnace for the heat-treatment of workpieces comprising an endless chain-like conveyer belt (18) consisting of a ceramic material and having a plurality of links (34, 34', 34", 34'''; 36, 36',36', 36''''; 38, 38', 38") which are arranged one beside the other and one behind the other and which are interconnected by rods extending transversely to the feeding direction (19). The arrangement provides that a plurality of separate rods (40, 44, 48) are provided one behind the other, viewed over the full width of the conveyor belt (18), and that gaps (42, 46, 50 to 55) remaining between the separate rods are offset laterally, viewed in the feeding direction (19).

8 Claims, 2 Drawing Sheets

CONTINUOUS FURNACE FOR THE HEAT-TREATMENT OF WORKPIECES

BACKGROUND OF THE INVENTION

The present invention relates to a continuous furnace for the heat-treatment of workpieces comprising an endless chain-like conveyer belt consisting of a ceramic material and having a plurality of links which are arranged one beside the other and one behind the other and which are interconnected by rods extending transversely to the feeding direction.

A continuous furnace of the describe type, which has a conveyer belt consisting of a ceramic material, has been known, for example, from a leaflet published by CERAMIC FURNACE BELT Inc., U.S.A.

The continuous furnace comprises a heating and a cooling zone, and the endless conveyer enters the continuous furnace by its inlet end, passes both the hot and the cold zones of the furnace, and leaves the furnace by its run-out end. Thereafter, the conveyer belt is returned from the run-out end, via a guide pulley, underneath the furnace and then back to the inlet end via another guide pulley.

The conveyer belt as such consists of a plurality of links arranged one beside the other which, viewed in transverse direction, are interconnected by a single rod extending over the full width of the belt. The individual links, and the rods as well, consist of a ceramic material, for example of aluminium oxide. Conveyer belts consisting of ceramic materials have the advantage, as compared with metallic belts, that they are lighter in weight, can be exposed to higher temperatures and are, in addition, more resistant chemically.

A ceramic conveyer belt of this type is exposed continuously to heavy temperature variations and is, thus, subjected to very high and varying thermal stresses. In addition, considerable mechanical stresses are exerted upon the belt, the latter having a considerable weight of its own when the furnace has a length of 20 m for example, so that the prevailing frictional forces are relatively important and correspondingly high mechanical traction forces have to be applied for moving the belt.

On their way through the system, the chain links as well as a rod connecting them in the transverse direction are exposed to varying temperatures between approximately 1.300° C. and 20° C. so that significant internal stresses occur in the material, in spite of the latter's relatively low coefficient of expansion. It is a drawback of such a conveyer belt comprising rods extending over its full width that the stresses developing over the entire width, due to the varying thermal strains and the uninterrupted mechanical stresses, lead to frequent breakage of the rods. This may even lead to the conveyer belt breaking apart fully in the area of a transverse rod, an event which, when occurring in the hot zone, results in extensive dismantling work.

SUMMARY OF THE INVENTION

Now, it is the object of the present invention to provide a continuous furnace comprising a ceramic conveyer belt, which offers prolonged service life, i.e., in particular, a reduced risk of breakage for the transverse rods.

This object is achieved according to the invention by the fact that a plurality of separate rods are provided one behind the other, viewed over the full width of the conveyer belt, and that gaps remaining between the separate rods are offset laterally, viewed in the feeding direction.

The stresses building up in the connection rods, which are shorter than in the case of the prior art, are lower than in the case of the prior art, which results in increased breaking strength and, thus, improved service life of the rods. It has been observed that the rods tend to break more frequently the longer they are. This can be explained by the fact that the internal stresses building up in the long rods due to the varying thermal strains, combined with the continuing mechanical stresses resulting from the traction forces exerted by the drive and the pressures exerted by the workpieces positioned on the conveyer belt can no longer be absorbed by the ceramic material, under the rough and varying operating conditions, with the result that a higher rate of breakage is encountered. In the case of ceramic materials, there is mostly no or only little plastic deformability between the comparatively small region of elastic deformability, and fracture. In addition, ceramic materials have a tendency to produce microcracks which as the stresses increase develop to macrocracks which then lead to breakage of the material. The small region of elastic deformability may have the result that in the case of very broad ceramic conveyer belts having relatively long full-width transverse rods not even the slightest bending of the rods is possible so that very frequent breakage of the rods is encountered, as has been observed also in practice.

The measure proposed by the invention, namely to use separate short partial rods, leads to a considerably longer service life of these partial rods and/or of the conveyer belt as a whole. The offset arrangement of the gaps in the longitudinal direction yet produces a strong chain link structure in a sense that a sturdy conveyer belt is obtained in both the longitudinal and the transverse direction. The use of the short partial rods and the offset arrangement of the gaps provide an additional considerable advantage, namely that in the event one of the transverse rods should still break, the other partial rods present at that particular feeding level remain intact to the extent that continued operation of the conveyer belt is rendered possible. The necessary replacement of the broken partial rod may be effected at a later point in time, and in an area where it is easily accessible so that no manipulations are required to be carried out inside the hot furnace housing. Consequently, the lot of workpieces being treated at the time the breakage occurs can be run further through the heat-treatment process, and the partial rod can be exchanged subsequently. Thus, the object of the invention is achieved in full.

According to another embodiment of the invention, the conveyer belt is built up from strip-like plate links receiving between them bushes through which the rods are passed, the outer upright lateral longitudinal edges of the plate links forming the conveyer belt surfaces.

The advantage of this feature resides in the fact that a plate link chain structure is provided which comprises open areas between the plate links, which open areas allow convection and thermal radiation to take place through the belt. This allows a rapid and uniform heat exchange over the full width of the conveyer belt, in particular in the transition zones between cold and hot or hot and cold. Consequently, no significant heat gradient is encountered in the transverse direction of the conveyer belt at the transition points so that the short partial rods will cool down or heat up more uniformly over their length and, consequently, the unavoidable thermal stresses will build up and be removed more uniformly over the length of the rods, which in turn increases the latters+ service life. The workpieces as such being in contact only with the upright lateral longitudinal edges of the plate links, the workpieces themselves then also follow the temperature variations rapidly, and as a result only insignificant temperature gradients build up between the workpieces and the ceramic parts on which they are supported. This increases the service life of the conveyer belt once more.

According to another embodiment of the invention, two successive, laterally offset gaps are offset laterally by at least the width of one chain section. This feature provides the advantage that the mechanical properties of the conveyer belt are not impaired by the gaps as regards tensile strength and flexion.

According to still another embodiment of the invention, groups of at least four plate links, with a bush arranged therebetween, are interconnected by a rod, at least in the lateral marginal area of the conveyer belt.

This feature provides the advantage that at least one continuous chain section is produced in each of the lateral marginal areas of the conveyer belt, so that the conveyer belt is closed continuously on both sides over a predetermined section whereby the latter's surface stability is improved.

Another embodiment of the invention provides that at least two gaps located at the same latitude follow each other in the longitudinal direction.

This feature provides the advantage that at least two segments of uniform design follow each other in the feeding direction, which facilitates the assembly.

According to another embodiment of the invention, the inner longitudinal edges of each plate link, opposite the outer straight lateral longitudinal edges, display a curved central area, the sense of curvature being identical to that of the guide pulleys about which the conveyer belt runs, while the radius of curvature is smaller than the radius of the guide pulleys.

This feature provides the advantage that the straight outer lateral edges provide a plane supporting surface for the workpieces while the curved inner longitudinal edges, which have a radius of curvature smaller than the radius of the guide pulleys, make it possible for the conveyer belt, in the returning area, to apply itself against the outer surface of the guide pulleys in the area of the transverse rods. As a result, the bending forces exerted upon the plate links in the returning area are not as important as would be the case if the inner edges were straight. This feature again leads to an extension of the service life of the plate links and, thus, of the conveyer belt.

It is understood that the features that have been described before and will be explained hereafter may be used not only in the described combinations, but also in any other combination, or individually, without leaving the scope and intent of the present invention.

BRIEF DESCRIPTION OF THE DRAWINGS

One selected embodiment of the invention will now be described and explained in more detail with reference to the drawing in which.

DESCRIPTION OF THE PREFERRED EMBODIMENT

Figure 1:
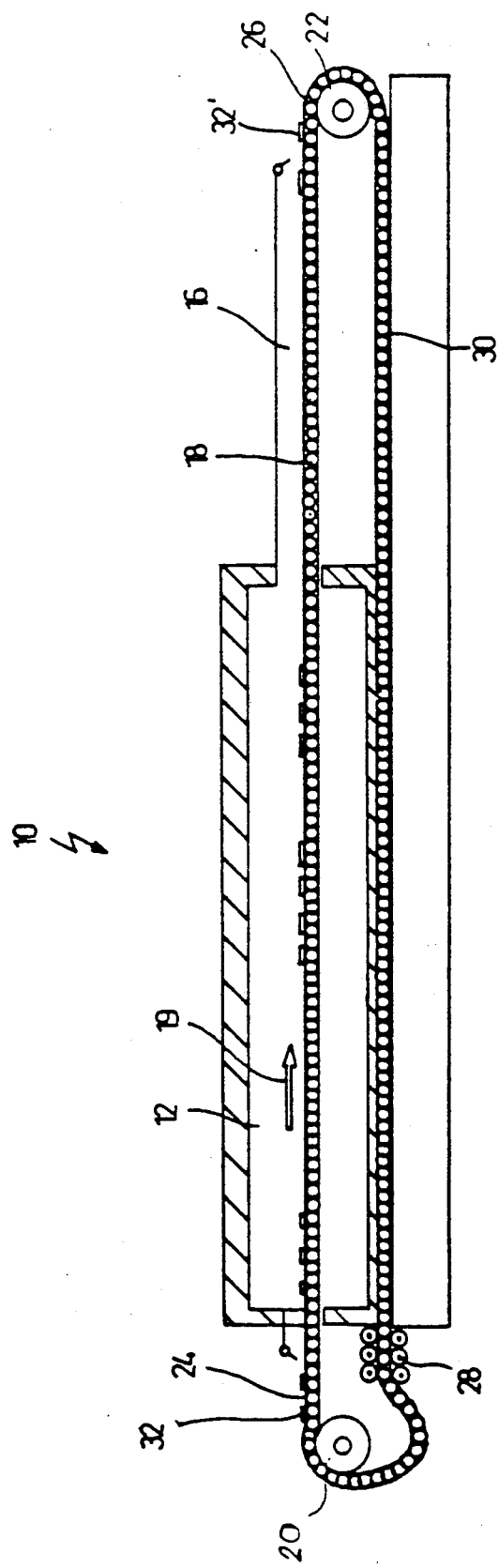
FIG. 1 shows a very diagrammatic longitudinal section through a continuous furnace according to the invention comprising a ceramic conveyer belt.

A continuous furnace 10 as illustrated in FIG. 1 comprises a heating zone 12 and a run-out zone 16 following the latter. The continuous furnace 10 is passed by a conveyer belt 18 in the direction indicated by an arrow 19, i.e. the conveyer belt runs through the furnace 10 in the direction from the heating to the run-out zone 16.

The temperature prevailing in the heating zone 12 is approximately 1300° C., while a temperature around room temperature is reached at the end of the run-out zone 16.

The run-out zone 16 is followed by a discharge zone 26 following which the conveyer belt 18 is guided around a guide pulley 20 and then returned, via a return path 30, to a roller drive 28 at the beginning of the continuous furnace 10. The roller drive 28 drives the endless conveyer belt 18.

After having left the roller drive 28, the conveyer belt 18 runs around another guide pulley 20 and then, via a loading zone 24, back to the heating zone 12.

In operation of the continuous furnace 10, therefore, workpieces 32 are guided from the loading zone 24 to the discharge zone 26 where they can be discharged as treated workpieces 32'.

Figure 2:
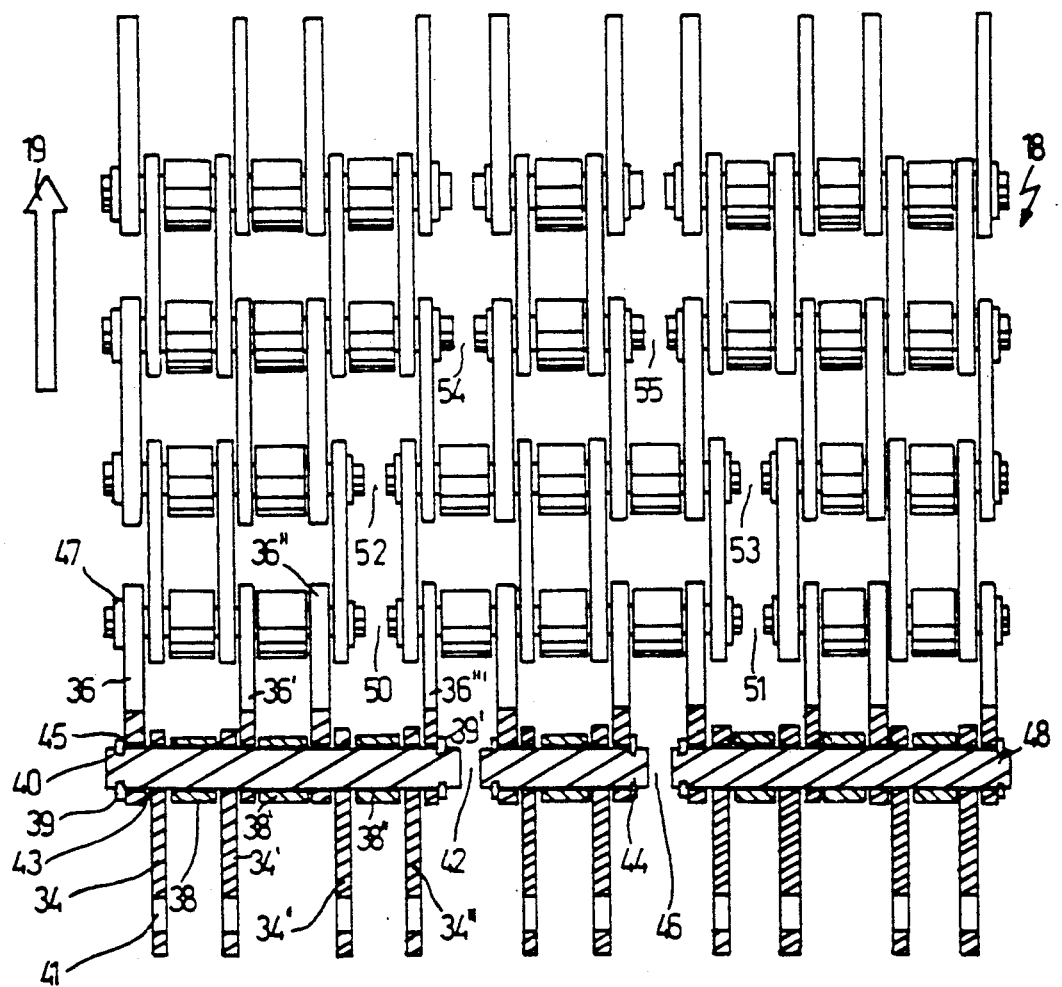
FIG. 2 shows a top view, in section and partially broken away, of a ceramic chain-link conveyer belt.
Figure 3:
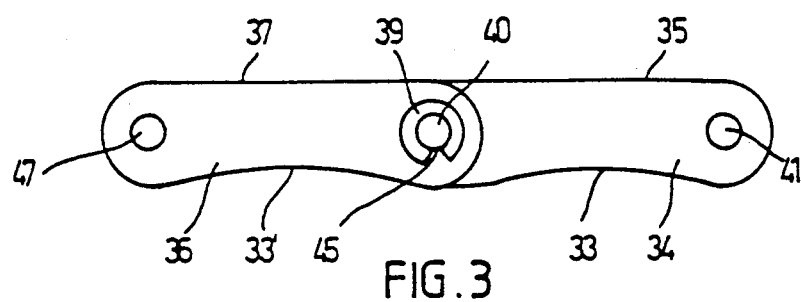
FIG. 3 shows a side view of a detail of the conveyer belt illustrated in FIG. 2.

As can be seen best in FIGS. 2 and 3, the conveyer belt 18 is built up from strip-like plate links 34, 36.

Ten plate links 34, 34', 34 . . . are arranged one beside the other over the width of the conveyer belt 18. Each of the plate links is provided with openings 41 and 43 in its forward and rear end portions, respectively.

As can be seen best in FIG. 2, the before-mentioned plate links are followed in the feeding direction 19 by ten further plate links 36, 36', 36" . . . provided with openings 45 and 47 in their respective end portions.

The plate links display straight upper upright longitudinal edges 35, 37, respectively, and are interconnected in such a way that in the flat condition of the plate links 34, 36, the said edges all extend along a horizontal plane. The sum of the longitudinal edges 35 and 37, therefore, constitute the supporting surface for the workpieces 32.

The longitudinal edges opposite the straight longitudinal edges 35, 37, i.e. the lower edges in the representation of FIG. 3 and the inner longitudinal edges of the closed conveyor belt 18 (FIG. 1), display a central curved area 33, 33' having a radius of curvature which is somewhat smaller than the radius of the guide pulleys 20, 22. Due to this design, when the plate links run around the guide pulleys 20, 22, they come to rest on the outside of the guide pulleys 20, 22 only in the area of the interconnecting rod. If the lower edges were straight, they would come to rest on the guide pulley by an approximately central point-like area so that the area where the plate links are interconnected by the transverse rods would be spaced a certain distance from the outside of the guide pulleys 20, 22. This spacing would vary as the plate links pass around the guide pulleys, and as a result the plate links would be subjected to varying bending forces. This is excluded by the curved design of the links.

As can be seen best in FIG. 2, the four plate links 34, 34', 34", 34''' are interconnected and connected with four plate links 36, 36', 36", 36''' via a first rod 40 which is passed through the openings 43, 45 provided in the end portions of the plate links 34, 36. The arrangement is such that two outer plate links 36, 36' enclose between them two inner plate links 34, 34' which latter enclose between them a bush 38 which determines the spacing between the plate links 34, 34' and whose hollow center is passed by the first rod 40. Another bush 38' is received between the plate links 36' and 36". The plate links 36" and 36''' enclose between them two plate links 34" and 34''', as well as a bush 38" arranged between the latter.

The plate links 34, 34', ... ; 36, 36', ..., the first rod 40 and the bushes 38, 38', 38" all consist of the same ceramic material, in particular of aluminium oxide. A ring 39, 39' is fitted on each of the ends of the first rod 40 which project beyond the outermost plate links 36 and 36'''. The rings are received in an outer annular groove—not identified in the drawing—in the rod 40, so that the total assembly consisting of the eight plate links 34, 34', ... ; 36, 36', ..., the three bushes 38, 38', 38" and the rod 40, is held together in a captive manner by the rings 39, 39'.

According to another embodiment of the invention, pins are provided instead of the rings 39, 39', which pins are inserted in radial bores in the projecting end portions of the rods.

Viewed in transverse direction from left to right, the assembly that has been described before is followed by another corresponding assembly consisting of four plate links, not separately identified in the drawing, which are interconnected by a second rod 44. Consequently, a gap 42 is formed between the first rod 40 and the second rod 44. The assembly which is held together by the said rod 44 is followed by a further assembly consisting of eight plate links and three bushes the centers of which are passed by a third rod 48.

Consequently, another gap 46 is formed between the second rod 44 and the third rod 48.

Viewed in the feeding direction 19, the assembly 3-1-3 (number of bushes) with two gaps, which is illustrated by the sectional view of FIG. 2, is followed by an assembly 2-3-2 which likewise comprises two gaps 50 and 51.

The gap 50 is offset to the left, relative to the gap 42, by the width of one chain section, while the gap 51 is offset to the right, relative to the gap 46 by the width of one chain section.

The before-described assembly is followed in the feeding direction 19 by another identical assembly 2-3-2 comprising two gaps 52, 53. This latter assembly is again followed by an assembly 3-1-3 whose gaps 54 and 55 are positioned at the same level, viewed in transverse direction, as the gaps 42 and 46.

In the left and the right marginal areas of the conveyor belt 18, 2-bushing assemblies are provided in such a way that two chain sections are formed continously in each marginal area.

There is also the possibility to make the gaps 42, 46, 50-55 narrower, i.e. to give the projecting end portions of the partial rods 40, 44 and 48 a somewhat greater length, without however letting them get into contact one with the other. During assembly, one can then fit a bush on these projecting end portions so that the gap areas between the partial rods are covered by a bush.

I claim:

1. A continuous furnace for the heat-treatment of workpieces, comprising
    an endless chain-like conveyer belt made of a ceramic material, said conveyer belt running through said furnace, thereby conveying workpieces to be heat-treated,
    said conveyer belt having a plurality of links arranged in a conveying direction successive one behind the other, and in a direction transversely to said conveying direction one beside the other, said links are interconnected via a plurality of separate rods extending transversely to said conveying direction of said conveyer belt,
    wherein, viewed over the full width of said conveyer belt along a longitudinal axis of a rod, said plurality of separate are disposed one behind the other, forming a series of separate rods each separate rod interconnecting at least two of said links arranged in transverse direction one beside the other, thereby providing gaps between adjacent rods of said series of separate rods disposed one behind the other in transverse direction,
    and wherein said gaps of one series of separate rods are offset laterally with respect to gaps of another series of rods of said conveyer belt.

2. The continuous furnace according to claim 1, wherein, viewed in said conveying direction, two successive gaps are offset laterally.

3. A continuous furnace according to claim 1, wherein, viewed in said conveying direction, at least the gaps of two successive series of separate rods are located identically.

4. A continuous furnace according to claim 1, wherein said links of said conveyer belt are designed as strip-like plate links receiving hollow bushes therebetween, a respective separate rod interconnecting at least two links passes through a bush disposed between said two links, an assembly of two transversely adjacent links having a bush received therebetween provides a basis width of a chain section of said conveyer belt.

5. A continuous furnace according to claim 4, wherein groups of at least four plate links having a bush arranged therebetween are interconnected by a rod at least within a lateral marginal area of said conveyer belt.

6. A continuous furnace according to claim 4, wherein two successive, laterally offset gaps are offset laterally by at least the width of one chain section.

7. A continuous furnace according to claim 1, wherein outer upright longitudinal edges of said links forming a conveyer belt surface for disposing having the workpieces thereon.

8. A continuous furnace according to claim 1, wherein inner, longitudinal edges of each link, opposite to a said outer upright longitudinal edge display a curved central area, the sense of curvature being identical to that of a guide pulley about which the conveyer belt runs, while the radius of curvature is smaller than a radius of said guide pulley.

* * * * *